Jan. 17, 1967  A. S. J. LEE  3,298,371
FREEZING PROBE FOR THE TREATMENT OF TISSUE, ESPECIALLY
IN NEUROSURGERY
Original Filed July 26, 1962  2 Sheets-Sheet 1
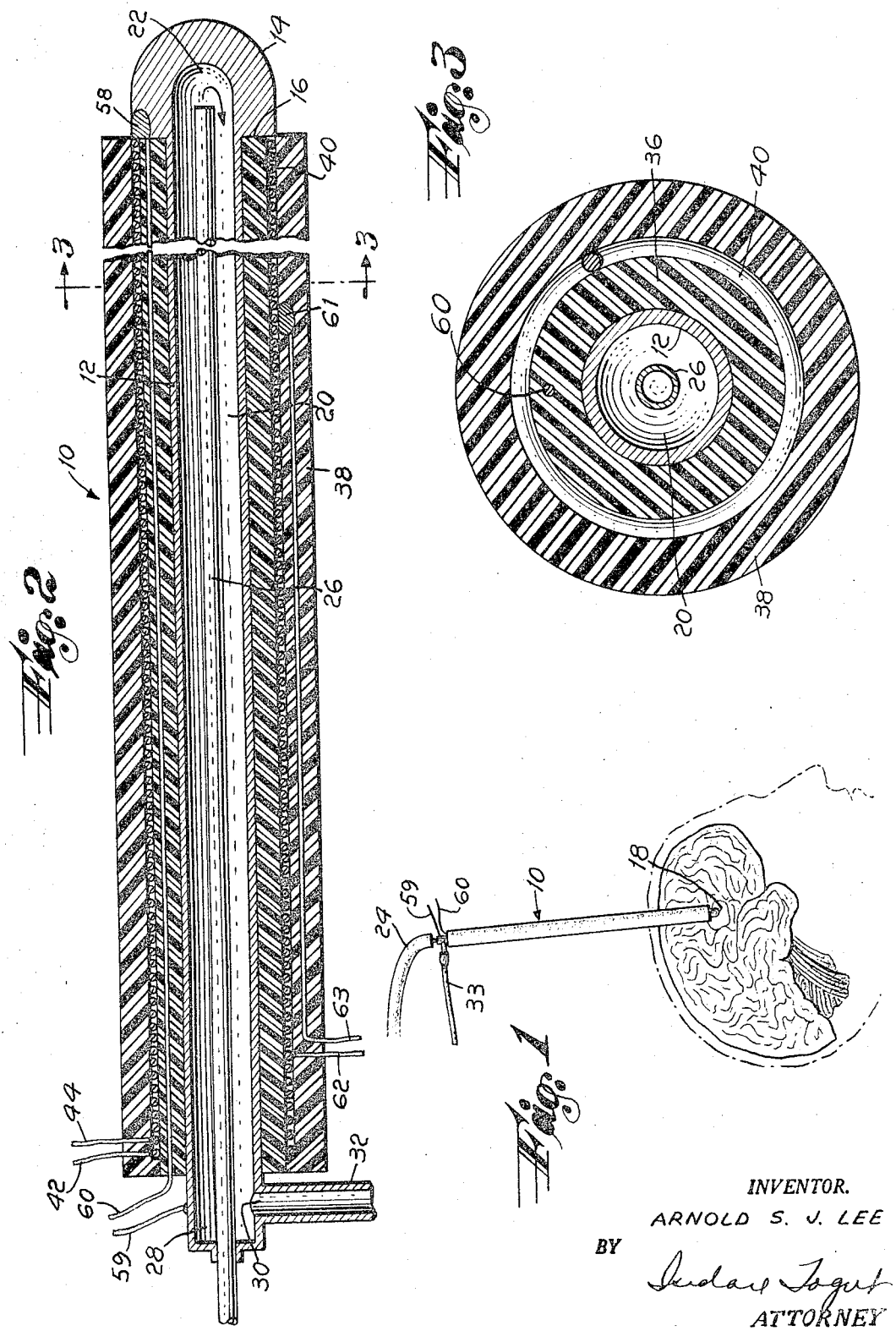
INVENTOR.
ARNOLD S. J. LEE
BY
ATTORNEY

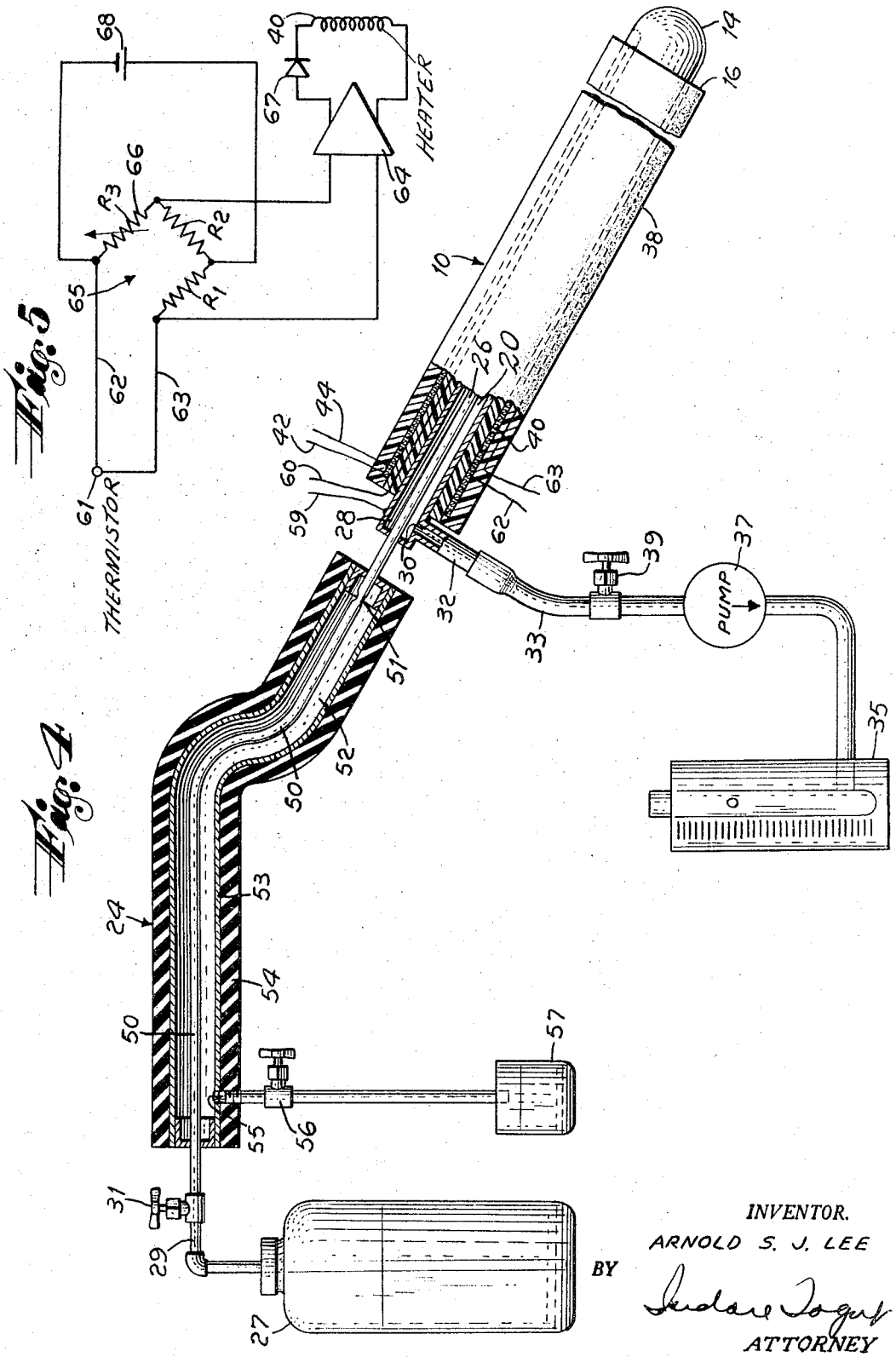

United States Patent Office 3,298,371
Patented Jan. 17, 1967

3,298,371
FREEZING PROBE FOR THE TREATMENT OF
TISSUE, ESPECIALLY IN NEUROSURGERY
Arnold S. J. Lee, 2375 Hudson Terrace,
Fort Lee, N.J. 07024
Continuation of application Ser. No. 212,702, July 26,
1962. This application Feb. 11, 1965, Ser. No. 436,710
3 Claims. (Cl. 128—303.1)

This application is a continuation of my prior abandoned application Ser. No. 212,702 filed July 26, 1962. The invention relates to a freezing probe and associated equipment for obtaining a deadening effect on tissue wherein the tip of the probe is at an accuratley regulated low temperature.

Heretofore probes or electrodes of various kinds have been employed for insertion in the cranial cavity to deaden a particular area of the human brain. Catheters for this purpose embody a hollow tube through which media such as a quantity of jellied alcohol, or an electrode, may be inserted for direct contact with the brain tissue. A disadvantage of neurosurgery catheters is that their action, once initiated, is final. There is no way of controlling the effect of a particular dosage once administered. For instance, an electric current of predetermined strength and duration will damage brain tissure permanently and the use of cell-killing material, such as jellied alcohol and the like, will deaden a crudely predetermined area of the brain according to the dosage used.

A freezing probe for use in neurosurgery, for most applications, must provide a cold spot of minute area at the tip end, and the cross-section of the probe must be small, of the order of 0.09 inch. Heretofore this dimensional requirement has precluded the use of a liquified-gas refrigerant, since the rise in temperature of the liquid in the body of the probe formed bubbles of gas which resulted in stoppage or irregular flow of the refrigerant. This made it impossible to obtain the controlled cooling of the tip desired. It has thus been considered impractical to use a liquid refrigerant in a freezing probe for neurosurgery.

The object of the invention, in general terms, is to provide a freezing probe for neurosurgery utilizing liquid nitrogen and capable of temperature regulation where desired. In addition, the probe is constructed to limit the freezing effect to a minute area of tissue while maintaining the adjacent tissue above the freezing point.

According to the present invention, means are provided for affording a deadening effect on body tissue, the effect being regulated to be either non-destructive or destructive as desired. This is accomplished by employing liquid nitrogen in a freezing probe having a minute or relatively small freezing tip which may be brought into conductive relation with the tissue, preferably with means for regulating the temperature of the nitrogen refrigerant to control the extent of freezing of the tissue.

In accordance with the invention, the freezing probe comprises an insulated bore having an exposed metallic freezing tip and an inner tube through which liquid nitrogen is introduced. A temperature-measuring device is preferably embedded in the tip of the probe, so that the desired temperature may be maintained by regulating the flow of the refrigerant. In order to prevent undue vaporizing of the liquid nitrogen in the probe before reaching the tip, a heat exchanger in the form of an elongated counter-current cooler surrounds the inlet conduit to maintain the nitrogen in a very cold state.

FIGURE 1 is a schematic illustration of the probe of the present invention in operative position in cranial tissue;

FIGURE 2 shows a low temperature probe made in accordance with the present invention;

FIGURE 3 is an enlarged sectional view taken substantially on line 3—3 of FIGURE 2;

FIGURE 4 is a diagrammatic illustration of a complete system embodying the present invention; and FIGURE 5 is a schematic electrical diagram of a system for controlling the temperature of the probe of the present invention.

In the drawing, the probe of the present invention is indicated generally by reference numeral 10 and includes a metallic tubular body 12 having at one end thereof an enlarged head or tip 14 defined by a shoulder 16. The enlarged head 14 is preferably in the neighborhood of .09 inch in diameter and may be formed with a pointed end 18 for insertion in the brain tissue for stereotaxic neurosurgery. The head 14 may be much larger for other types of surgery.

The body 12 of the probe is formed with a bore 20 which extends into the enlarged head 14 and terminates in the end 22. Positioned coaxially within the bore 20 is a tube 26 through which liquid nitrogen is introduced from a storage reservoir or container 27 through a conduit 29. Surrounding the tubular body 12 is a layer of insulation 36 to thermally isolate the body 12 from its environment. The flow of liquid nitrogen may be controlled by a valve 31 and may be maintained in a very cold state by means of a flexible heat exchanger 24 in the form of an elongated counter-current cooler in which a controlled flow of liquid nitrogen is fed through a valve 31 into a flexible conduit 50 which has holes 51 in its walls at the far end to permit passage of some of the liquid nitrogen refrigerant into the annular passageway 52 formed by the flexible outer tube 53. The tube 53 may be thermally insulated on its exterior surface by a flexible covering 54. The remainder of the liquid nitrogen passes into the tube 26, thence into the hollow tip 14, and out through the outlet tube 32. The nitrogen evaporates in the tip 14, and effectively removes heat from the contacting tissue by conduction. Used nitrogen in the heat exchanger 24 exits from the passageway 52 through a port 55, and a valve 56 to a container 57 or to some other waste system. The differential flow of nitrogen through the port 55 and through the tube 26 is controlled by the valve 56, thus controlling the temperature of nitrogen entering the inlet of the probe and the temperature of the tip 14 of the probe.

At the inlet end of the body portion 12 is positioned a collecting chamber 28, in communication with the bore 20 and provided with a port 30 to which is connected the tube or conduit 32. After the liquid nitrogen has selectively absorbed heat from tissue surrounding the tip 14, it flows through flexible tubing 33, desirably of heat conductive material, to a flow meter 35. The flow may be accelerated by a pump 37 and controlled by a valve 39.

According to a feature of the present invention, means are provided for heating the exterior of the body insulation 36 if the insulation is inadequate to completely thermally isolate the tissues surrounding the probe from the cold body of the probe 10. To this end, the body 12 may be provided with a first layer of insulating material 36 and a second layer of insulating materal 38 having an inside diameter substantially the same as the diameter of the shoulder 16. Arranged between the insulating layers 36 and 38 are the windings 40 of an electrical resistance conductor such as copper wire or the like, having terminals 42 and 44 which can be arranged in any suitable electric circuit for transmitting current through the winding 40 and heating the exterior of the insulating element 36 by electrical resistance, to a desired temperature.

A temperature measuring thermistor 58 is embedded in the tip 14. The thermistor 58 has electrical leads 59 and 60 which are carried thru the insulation 36 or 38 and are connected to a meter or recorder (not shown).

Another thermistor 61 with leads 62 and 63 brought through the insulation 38 may be affixed near the exterior surface of the probe 10 to measure the temperature of the exterior of the probe by connection to a meter or recorder (not shown).

In FIG. 5 is shown a control system to assure maintenance of the desired temperature of the probe 10. The thermistor 61 is connected to a Wheatstone bridge 65 by leads 62 and 63. The Wheatstone bridge 65 is powered by a battery 68 and is balanced by a rheostat 66. The output of the bridge 65 is amplified by D.C. amplifier 64 which powers the heater element 40 through a diode 67.

The low temperature probe of the present invention exhibits important advantages over neurosurgical catheters heretofore known. For instance, the rate of flow of the nitrogen and thus the temperature of the tip 14 may be regulated to obtain any desired deadening effect. This contrasts sharply with prior neurosurgical catheters in which the effect of a particular dosage could be regulated. Also, a perfectly spherical frozen area approximately 9 mm. in diameter may be formed at the tip of a 9 inch long probe without freezing or cooling along its length.

The foregoing detailed description of one embodiment of the invention has been given to explain the underlying principles thereof, and no unnecessary limitations should be understood therefrom. Certain modifications will be obvious to those skilled in the art, since the specific apparatus described is especially adapted for brain surgery and some elements may be altered or even omitted entirely for other applications.

What is claimed is:
1. Apparatus for neurosurgery comprising
an elongated freezing probe having an external transverse diameter of approximately 0.09 inch and a thermally conductive freezing tip,
means including a temperature-responsive device embedded in the tip of said probe for measuring the tip temperature,
means for supplying liquid nitrogen to said probe for cooling the tip, and
means for minimizing gasification of the liquid nitrogen as it flows through said probe.
2. Apparatus for neurosurgery according to claim 1, in which the liquid nitrogen is supplied to said freezing probe through a flexible tube and the means for minimizing gasification of the liquid nitrogen includes means for conducting liquid nitrogen around the exterior of said tube to cool the nitrogen refrigerant flowing therein.
3. A freezing probe for treatment of body tissue comprising
a hollow insulated tube containing liquid nitrogen, said tube terminating in an uninsulated tip and being approximately 0.09 inch in diameter, and
means for measuring the temperature of the tip of the probe including a temperature-responsive device embedded in said tip.

References Cited by the Examiner

UNITED STATES PATENTS

| | | | |
|---|---|---|---|
| 1,902,016 | 3/1933 | Copeman | 128—400 X |
| 2,319,542 | 5/1943 | Hall | 128—400 |
| 2,645,097 | 7/1953 | Posch. | |
| 2,672,032 | 3/1954 | Towse. | |
| 2,746,264 | 5/1956 | Keyes | 128—399 X |
| 2,758,194 | 7/1956 | Heron | 128—400 X |
| 3,125,096 | 3/1964 | Antiles et al. | 128—401 |
| 3,190,081 | 6/1965 | Pytryga | 62—293 |
| 3,220,414 | 6/1965 | Johnston | 128—400 |

OTHER REFERENCES

The Lancet, pages 12–15; Jan. 3, 1959, Rowbotham, 401.

RICHARD A. GAUDET, *Primary Examiner.*

SIMON BRODER, *Examiner.*